United States Patent
Kauppi et al.

(10) Patent No.: US 6,875,301 B2
(45) Date of Patent: Apr. 5, 2005

(54) METHOD FOR MANUFACTURING AN INJECTION MOULDED PRODUCT

(75) Inventors: Matti Kauppi, Märynummi (FI); Mika Sulasaari, Tampere (FI); Tarmo Mäenpää, Salo (FI); Kalle Väänänen, Halikko As. (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/952,228

(22) Filed: Sep. 13, 2001

(65) Prior Publication Data

US 2002/0048667 A1 Apr. 25, 2002

(30) Foreign Application Priority Data

Sep. 15, 2000 (FI) .............................................. 20002038

(51) Int. Cl.[7] .......................... B29C 45/14; B29C 45/16
(52) U.S. Cl. ....................... 156/245; 264/132; 264/135; 264/247; 264/254; 264/255; 264/275; 264/279.1
(58) Field of Search ................................. 264/247, 255, 264/271.1, 275, 279.1, 328.8, 132, 135; 156/245

(56) References Cited

U.S. PATENT DOCUMENTS

| | | | |
|---|---|---|---|
| 3,298,558 A | | 1/1967 | Nichol ........................ 220/63 |
| 3,312,197 A | * | 4/1967 | Smith ........................ 40/358 |
| 3,363,039 A | * | 1/1968 | Nagi et al. .................. 264/245 |
| 4,275,116 A | | 6/1981 | Kratschmer ................ 428/336 |
| 4,330,578 A | | 5/1982 | Nishihira et al. ............. 428/13 |
| 4,481,160 A | * | 11/1984 | Bree ......................... 264/135 |
| 4,495,125 A | | 1/1985 | Hatakeyama et al. ....... 264/132 |
| 4,717,615 A | | 1/1988 | Reinhart ..................... 428/161 |
| 4,837,072 A | | 6/1989 | Kraetschmer .............. 428/201 |
| 4,994,224 A | | 2/1991 | Itoh et al. ................... 264/247 |
| 5,053,260 A | | 10/1991 | Brehm ........................ 428/40 |
| 5,525,179 A | * | 6/1996 | Stickling .................... 156/245 |
| 5,714,231 A | | 2/1998 | Reinhart .................... 428/156 |
| 5,795,527 A | | 8/1998 | Nakamura et al. .......... 264/267 |
| 5,800,759 A | | 9/1998 | Yamazaki et al. .......... 264/163 |
| 6,117,384 A | | 9/2000 | Laurin et al. ............ 264/297.2 |
| 6,468,458 B1 | * | 10/2002 | Anderson et al. ........... 264/246 |

FOREIGN PATENT DOCUMENTS

| | | |
|---|---|---|
| DE | 297 01 125 U1 | 4/1997 |
| DE | 19610687 A1 | 9/1997 |
| EP | 0 031 525 A2 | 7/1981 |
| EP | 0 633 585 A1 | 1/1995 |
| WO | WO 82/03713 | 10/1982 |

OTHER PUBLICATIONS

Definition of 'Film' from Webster's Ninth Collegiate Dictionary (1990), p. 463.*

* cited by examiner

Primary Examiner—Edmund H. Lee
(74) Attorney, Agent, or Firm—Perman & Green, LLP

(57) ABSTRACT

A method for producing an injected moulded product includes producing a first injection moulded layer having an external and an internal surface, of which the external surface is directed towards a front face of the injection moulded product. A foil is attache to the first injection moulded layer. The foil has first and second sides, and there is at least one pattern on the foil. The foil is placed against the internal surface of the first injection moulded layer. The injection moulded product my include a second injection moulded layer so hat the first injection moulded layer, the foil and said second injection moulded layer constitute, in this order, an integral layered structure. The first side of the foil is next to the internal surface of the first injection moulded layer and said second injection moulded layer is next to the second side of the foil.

12 Claims, 6 Drawing Sheets

METHOD FOR MANUFACTURING AN INJECTION MOULDED PRODUCT

TECHNOLOGICAL FIELD

The invention concerns generally the technology of producing injection moulded products. Especially the invention concerns the technology of producing such products that have certain features that originate from an in-mould decorating process.

BACKGROUND OF THE INVENTION

Injection moulding refers to the procedure of manufacturing products by injecting molten plastic material into a carefully designed mould that defines a cavity having the form of the desired end product. In-mould decorating may be generally understood to denote any technology, which applies text, pattern or image to a moulding as a part of the moulding process. In a more limited sense, which is also used in this patent application, in-mould decorating refers to a process where a decorative insert is placed into a mould before injecting molten plastic material into the mould. The word "decorative" should be understood widely, because in addition to purely aesthetic purposes the insert and/or the graphic objects carried by it may have e.g. informative or protective functions. From the technology of injection moulding there is known also the use of three-dimensional mechanical objects as inserts that typically serve as mechanical reinforcements, but in in-mould decorating applications the insert comes almost invariably in the form of a thin thermoformable foil, the base material of which is typically polycarbonate or an alloy thereof.

FIG. 1 is a cross-sectional diagram that illustrates certain phases of a very simple in-mould decorating process. Patterns 101 are first formed onto the surface of a foil 102 through screen printing or other suitable pattern-forming process. The patterned foil 102 is formed to make it conform to the three-dimensional form of the mould, which (mould) itself is not shown in FIG. 1. Several alternative methods are known for executing the forming step, such as vacuum or thermoforming, pressure assisted vacuum forming or the high pressure forming technology developed by the German companies Bayer and Niebling HDVF. In addition to converting the form of the foil from two-dimensional to three-dimensional, the piece of foil 102 belonging to a single workpiece is cut and trimmed to size, transferred to the moulding operation as well as positioned and secured into the mould. The plastic material is then injected into the mould so that it fuses onto the back of the foil 102 to form the bulk of the end product 103. Note that the relative thicknesses of the foil 102 and patterns 101 are greatly exaggerated in all drawings for the sake of graphical clarity. In the final product the decorative patterns 101 are clearly visible because they form the topmost layer on the surface of the product.

The disadvantage of having the printed patterns fully exposed on the outmost surface of the product is that the resistance of such a product against mechanical wear is poor. One of the most prominent areas of application for in-mould decorated plastic products are the outer covers of mobile telecommunications devices, which are constantly carried along in pockets, purses and bum bags where friction takes its toll on the outmost surface.

FIG. 2 illustrates how a protective coating 201 can be applied onto the outmost surface of the product e.g. by spraying it through a nozzle 202. This way the mechanical stability of the patterned surface can be remarkably enhanced, but the development comes at the cost of adding a stage to the manufacturing process. Many protective lacquers comprise easily evaporated solvents that are potential sources for fire and environment hazards in the manufacturing plant, which makes their use unattractive. The use of a separate coating layer makes the manufacturing process also more vulnerable to dust and other impurities in air.

FIG. 3 illustrates another solution to the problems concerning the mechanical stability of the decoration. A transparent foil 102 is used as the carrier of the decorative patterns 101, which are printed onto the inner surface (so-called second surface) of the foil instead of its outer surface like in FIGS. 1 and 2. In the final product the patterns 101 become sandwiched between the transparent foil 102 and the plastic body part 103 so that the former protects the patterns against external factors. This approach involves also certain difficulties that are mainly related to the patterns' poor resistance against the erosion caused by the hot, molten polymer resin that flows into the mould and along the printed surface of the foil.

FIG. 4 illustrates a double foil solution where instead of a single foil a laminated structure of two parallel foils 401 and 402 is used. The patterns 403 are formed on either the lower surface of the upper foil 401 or the upper surface of the lower foil 402 so that in the laminated foil structure they are enclosed in between the foils. The laminated structure is formed, cut and trimmed into size just as if it was a single foil in some of the above-described methods, after which it is places into the mould and the plastic bulk part 404 is injection moulded onto its inner surface. Using two parallel foils and laminating them together has, however, proven to be somewhat problematic because the foil structure tends in some cases to become visible on the surface of the completed product. Additionally the process becomes rather complex and involves a relatively large number of processing steps.

Previous patent publications that more or less concern the technology of decorating injection moulded products or articles comparable thereto are abundant. Known to the applicant at the priority date of this patent application are EP 0 199 708, EP 0 383 364, EP 0 430 310, U.S. Pat. Nos. 4,275,116, 4,717,615, 4,837,072, 4,994,224, 5,053,260, 5,714,231, 5,795,527 and 5,800,759.

SUMMARY OF THE INVENTION

It is an object of the present invention to present a decorated injection moulded product which is easy to manufacture, has excellent resistance against external wear and facilitates high yield in mass production. It is also an object of the present invention to present a method for manufacturing said decorated injection moulded product.

The objects of the invention are achieved by providing an injection moulded layer on the outside of the decorated foil that constitutes the insert in the injection moulding process, either by injection moulding on top of the foil or by injection moulding the product in concern in at least two injection moulded layers so that the decorative patterns and their carrier foil are inserted between said layers before injection moulding the latter one of them.

The invention applies to an injection moulded product comprising:
  a first injection moulded layer having an external surface and an internal surface, of which the external surface is directed towards a front face of the injection moulded product, a foil attached to the first injection moulded layer, the foil having a first side and a second side, and at least one pattern on the foil;

the product is characterised in that it comprises a second injection moulded layer, and that the first injection moulded layer, the foil and said second injection moulded layer constitute, in this order, an integral layered structure where the first side of the foil is next to the internal surface of the first injection moulded layer and said second injection moulded layer is next to the second side of the foil.

The invention applies also to a method for manufacturing an injection moulded product, comprising the steps of:

producing patterns on a foil, injection moulding a first injection moulded layer, and placing the foil next to said first injection moulded layer;

the method is characterised in that it comprises the step of injection moulding a second injection moulded layer onto the entity comprising the first injection moulded layer and the foil, so that the first injection moulded layer, the foil and said second injection moulded layer come to constitute, in this order, an integral layered structure where a first side of the foil is next to an internal surface of the first injection moulded layer and said second injection moulded layer is next to a second side of the foil.

An injection moulded plastic layer at the outmost surface of an injection moulded product offers excellent resistance against frictional wear and damages that result from external impacts, at least when compared to the modest durability of an insert foil made of polycarbonate. If the outmost layer is additionally at least partly transparent to electromagnetic radiation at the wavelengths of visible light, decorations or other patterns that are inside it can be observed from the outside. A further injection moulded plastic layer beneath the patterns may serve a multitude of purposes ranging from structural enforcement to providing depth to the visual appearance of the decoration.

According to a first aspect of the invention the (at least partly) transparent outmost layer is injection moulded first, without placing the decorative insert meant by the invention into the mould yet at this stage. The preformed insert is then placed against the inner surface of the already injection moulded transparent layer, and another layer of plastics is injection moulded onto the inner surface of the structure thus formed so that in the final product the insert remains between the injection moulded layers.

In order to protect the printed patterns on the insert layer from the erosion of the flowing polymer resin during the second injection moulding step it is advisable to have a non-printed surface as the one which comes against the second-step layer. This is most easily achieved by using a single insert foil printed on one side only so that the printed side comes against the first-step injection moulded layer. However, the invention does not preclude the use of multi-layered laminated inserts where patterns may come on multiple surfaces but where the inner surface of the innermost layer is non-printed to that said innermost layer acts as a protective layer. Even having patterns on the surface which comes against the second-step injection moulded layed is not completely excluded, provided that the problem of stability against flowing molten polymer resin can be solved e.g. by using some specific ink that has the required durability.

According to a second aspect of the invention the decorative insert is produced first and placed into the injection mould against the core or kernel of the mould. The (at least partly) transparent outmost layer is then injection moulded on top of the foil, where the direction-related term "on top" means that the injection moulded layer becomes the intended outer surface of the final product.

In addition to purely aesthetic decoration the invention can be used for many other purposes. The "decorative" pattern that is, as a result of using at least the first aspect of the invention, truly enclosed within the bulk material of an injection molded product is very well protected against unauthorised tampering, which means that a suitably designed pattern may serve as some kind of an authenticity certificate of the product. For similar purposes the pattern may have specific characteristics that are only observable under ultraviolet light or some other exceptional environmental conditions. If parts of an apparatus, which is located within an injection moulded cover, should be constantly available for visual observation while other parts should be hidden, a pattern layer may be used to keep the parts of the latter kind out of sight. If the "decorative" pattern layer is electrically conductive, it can even be used as a part of the electromagnetic shielding of the inner components.

In addition to the printed foil insert, also the bulk of the injection moulded layer(s) may be used to play a role in the decorative effect. For example colouring agents, metallic flakes or fluorescent or phosphorescent dyes can be mixed into the polymer resin so that they give the injection moulded part(s) a certain advantageous visual appearance. Because the outmost layer is much better visible than the inner layer(s), its material and properties can be optimised for good visual properties. In the products according to the first aspect of the invention the innermost layer need not be visible to the user at all, or at least it is much less visible than the outermost layer. Therefore its material and properties can be optimised for some other factors like structural stiffness and/or ease of adapting its inside for the mechanical attachment of the inner parts of the device.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIGS. 1 to 4 were discussed above in association with the description of prior art, so the following description of the invention and its advantageous embodiments focuses on FIGS. 5 to 9.

DETAILED DESCRIPTION OF THE INVENTION

Figure 1:
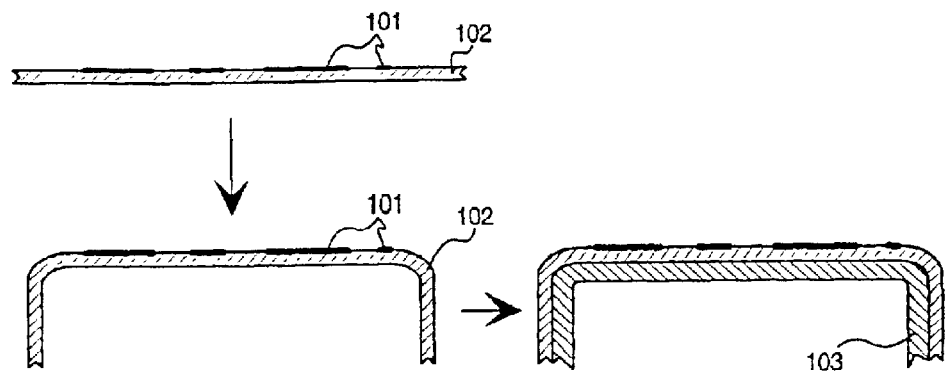
FIG. 1 illustrates the production of a decorated injection moulded product according to prior art.
Figure 2:
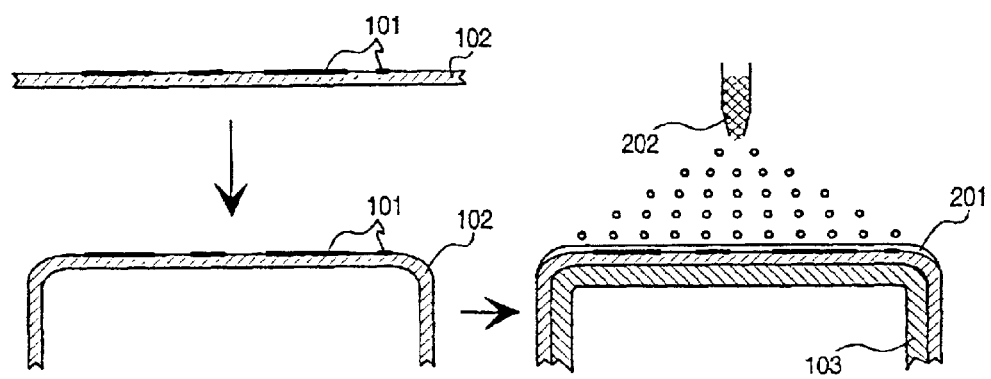
FIG. 2 illustrates the production of another decorated injection moulded product according to prior art.
Figure 3:
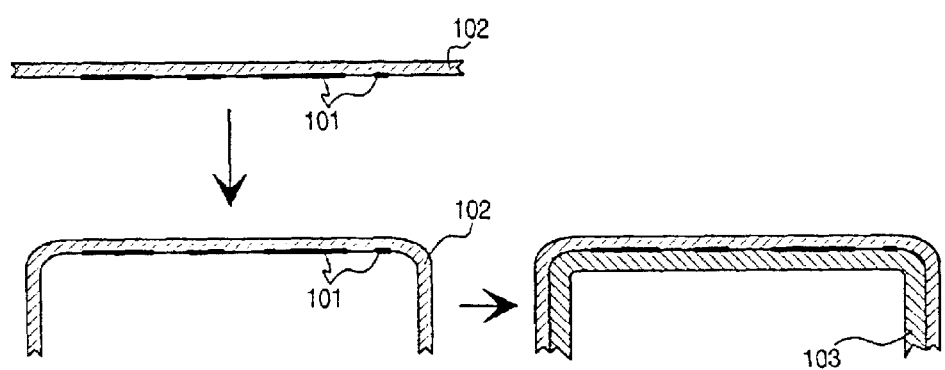
FIG. 3 illustrates the production of another decorated injection moulded product according to prior art.
Figure 4:
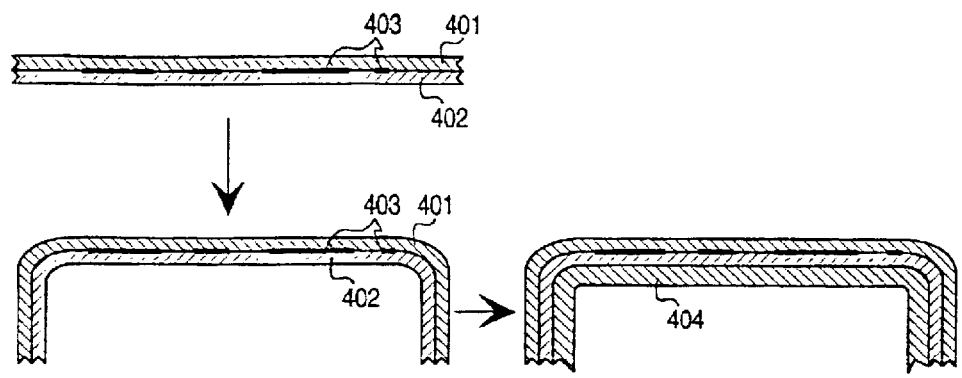
FIG. 4 illustrates the production of another decorated injection moulded product according to prior art.
Figure 5:
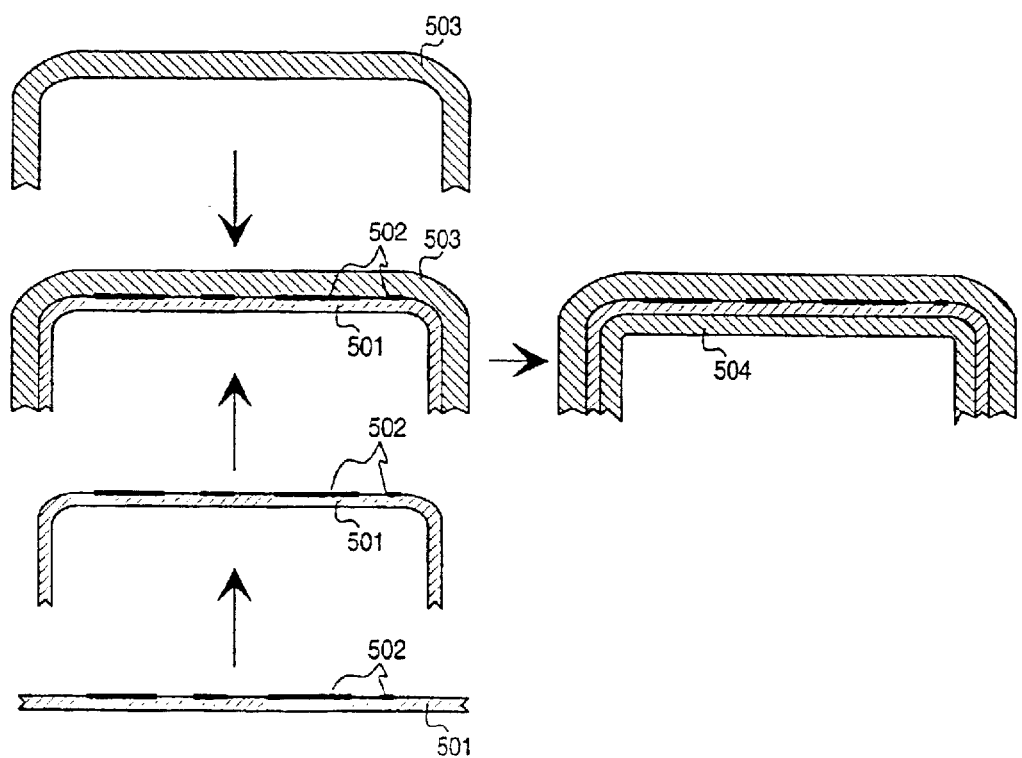
FIG. 5 illustrates the principle of the present invention.

In FIG. 5, which shows all parts schematically in cross-section, a foil 501 is provided as the carrier of decorative patterns 502. Both the term "decorative" and the term "patterns" should be understood broadly, because the graphical objects carried by the foil 501 can serve a multitude of purposes in addition to being just aesthetically decorative, and they may include various object types including bot not being limited to lines and two-dimensional shapes, bitmaps, hues and background colours, alphanumerical characters, photographic imagery and areas possessing various degrees of reflectivity or transparency. Any types of foils that are known to be applicable to in-mould decorating can be used as the foil 501; typically the foil consists of one or several layers of polycarbonate film. The foil 501 itself may have some basic (opaque or translucent) colour or it may be completely transparent. It may even consist of several differently coloured areas or patches. The foil 501 does not need to be continuous, although a certain degree of continuity is advantageous in terms of automated mass production. The foil 501 may comprise openings therethrough.

A first injection moulded part 503 is also provided. This part is to constitute an outer layer of the end product, and according to the invention it is at least partly transparent or translucent to visible light. In the following we denote the first injection moulded part 503 as the outer layer for short. The outer layer 503 may have some basic (opaque or translucent) colour or it may be completely transparent. It may even consist of several differently coloured areas or patches, and effect materials such as metal flakes or dyes can be mixed to the polymer resin from which the outer layer 503 is injection moulded in order to give it a specific appearance. The effect materials may have dynamically changing properties such as a changing tone according to ultraviolet radiation incident on the material or phosphorescent or fluorescent glow in the dark. The outer layer 503 does not need to be continuous and it may comprise openings therethrough. The foil 501 with its patterns 502 is preformed to correspond to the form of the inner surface of the outer layer 503. The preformed foil 501 is placed against the inner surface of the outer layer 503 most advantageously so that a non-patterned surface of the foil is the one which remains accessible on the inner surface of the combination.

A second injection moulded part 504, known also as the inner layer for short, is injection moulded onto the inner surface of the combination consisting of the outer layer 503 and the patterned, preformed foil 501 so that the inner layer 504 at least partly encloses the foil 501 in between the outer and inner layers. The functions of the inner layer 504 in the combined structure are generally physical and functional rather than aesthetic or decorative, although it may also take part in producing the outer appearance of the end product. The physical and functional nature of the inner layer 504 is to interpreted so that it provides mechanical support and rigidity to the combined structure and serves as means for attaching the structure, which is most likely an outer cover or the visible face of an electronic device, to the inner components of the device in question. Other parts such as light guides, latch and hinge mechanisms or parts thereof and threaded nuts can be placed within the inner layer 504 as inserts, and/or the inner layer may comprise portions that serve as holders for such other parts. The inner layer 504 may also have some basic (opaque or translucent) colour or it may be completely transparent. It may consist of several differently coloured areas or patches, and in case it has a role to play in decorating the end product, effect materials such as metal flakes or dyes can be mixed to the polymer resin from which the inner layer 504 is injection moulded. The inner layer 504 does not need to be continuous and it may comprise openings therethrough.

What is visible from the outside of the end product depends on the optical characteristics of the outer and inner layers and the patterned foil. One of the basic approaches in applying the invention is such where the inner layer 504 is not visible to the outside at all. This is most easily accomplished by using a transparent or translucent outer layer 503 and an opaque foil the opacity of which comes either from the foil material 501 being opaque or from the foil material being covered by a continuous, opaque pattern 502, or from both. Another approach is to use the colour of the inner layer 504 as the background colour for the end product and to use partially transparent or translucent outer layer 503 and foil 501, 502 so that the background colour is visible at those locations where no opaque patterning exists in outer layer or foil. Numerous alternative approaches can be derived from the use of multicoloured inner and outer layers, perforations in one or several of the layers and the foil and similar variations around the basic structural idea.

For the sake of graphical clarity of the appended drawings the patterns 502 only appear on the flat upper surface of the structure of FIG. 5. It is clear, however, that the invention does not place any limitations to the location of the patterns on any surfaces of the injection moulded product. Indeed it is a known major advantage of in-mould decorating that the patterns can be placed at arbitrary locations of the three-dimensional end product. Also for the sake of graphical clarity only the outer and inner layers appear in FIG. 5 to have even thickness throughout the layer, which is not a requirement that should be placed to the application of the invention. One of the visual effects produced through the application of the present invention might well be such where the outer layer 503 varies remarkably in thickness so that the patterned foil 501 is much closer to the overall outer surface of the end product at some locations that at some other locations. Combining this effect to a relatively heavy shading tint in the material of the outer layer 503 produces an interesting effect where the patterns 502 that are printed on the foil 501 appear to gain a third dimension. The varying thickness of the outer layer 503 may also be used to provide a lens effect where a detail of the patterned foil 501 appears to an observer in magnified or reduced size.

One of the effects of the foil 501 is to keep the plastic materials of the outer and inner layers isolated from each other. This may be particularly advantageous if the inner and outer layers are made of so different grades of plastic that bringing them into close contact would cause harmful effects, such as diffusion of dye substances from one layer to another. The foil may also act in the same way as the internal polymer film of laminated glass structures, enhancing the mechanical strength of the overall structure. If the foil, the patterns or parts thereof are electrically conductive, they may also act as a part of electromagnetic shielding to the electronic components that the structure consisting of the layers and the foil is to cover. If the inner and outer layers are transparent or translucent, but a certain component or other part inside the structure consisting of the layers and the foil should be hidden from unauthorised visual inspection, an opaque area in the foil can be used to cover the location of that component or other part.

Figure 6:
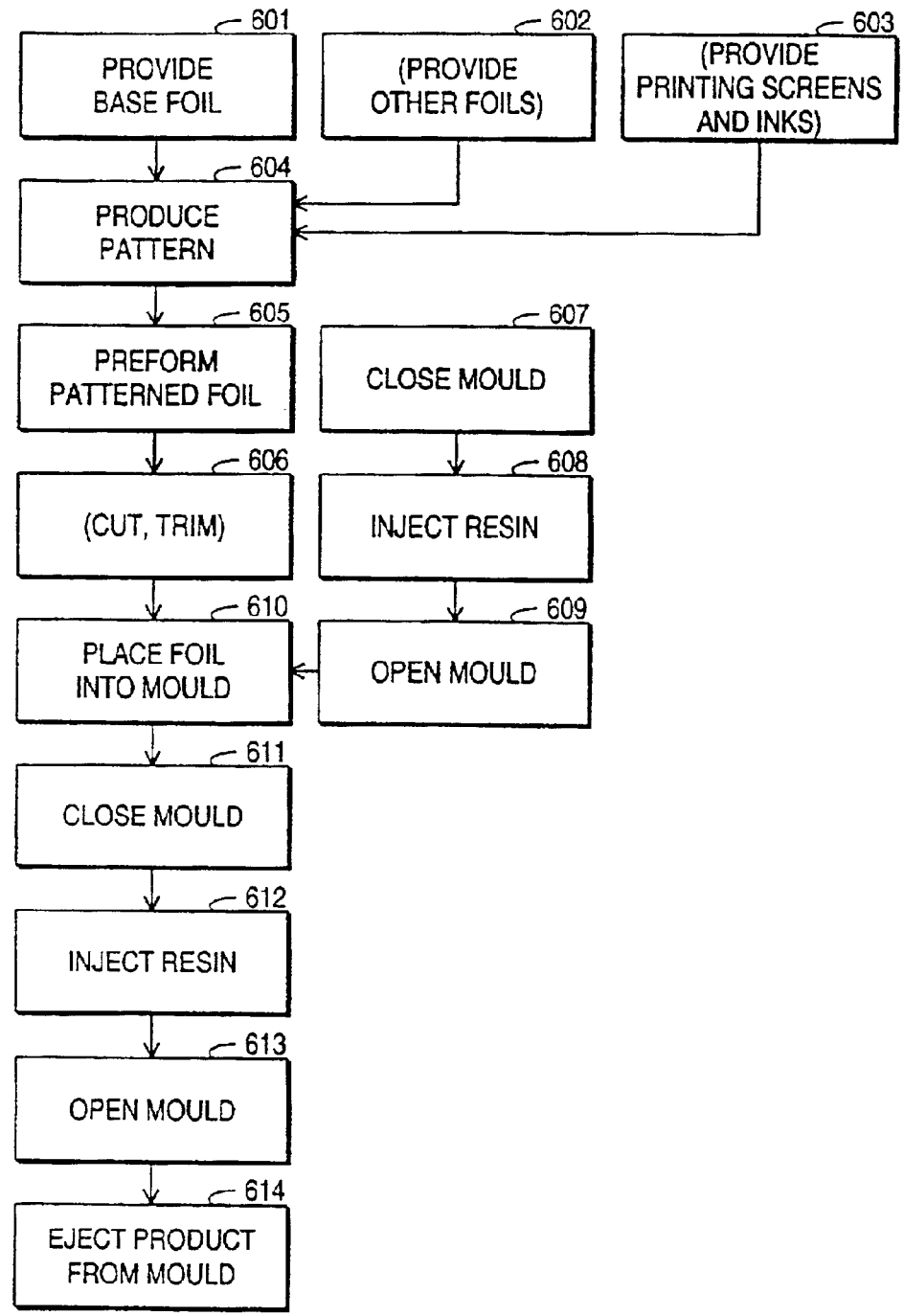
FIG. 6 illustrates a method according to an embodiment of the invention.

FIG. 6 illustrates a method for producing the in-mould decorated product shown in FIG. 5. At step 601 there is provided a base foil which is to act as the support, bonding and protective structure of the patterned foil. To prepare for the patterning step there may be needed preparatory steps, two examples of which are shown in FIG. 6: at step 602 there are provided other foils which or parts of which are to be attached to the base foil in order to produce the patterning, and at step 603 there are provided the printing screens through which the patterns are to be screen printed onto the base foil as well as the appropriate inks. The invention does not limit the number and nature of such preparatory steps. The patterning step is shown generally as step 604. It may comprise any forms of patterning, including but not being limited to screen printing, offset printing, digital printing, etching, holographic picture generation, painting, sputtering, plating, perforating, glueing and placing stickers onto the base foil. Also more exotic operations such as attaching light guides, resistors or other electronic components to the foil structure qualify as patterning.

After the patterning step there comes the preforming step 605 where the patterned foil is preformed to conform to the inside of the outer injection moulded layer. This step belongs to the usual known form of in-mould decorating. The invention does not limit the selection of the preforming method. In association with, or just as well separate from, the preforming step it is possible to cut and trim the piece of foil coming into a single workpiece as is illustrated by step 606. It is not obligatory to cut and trim the foil at all at this stage, if the manufacturing apparatus allows the continuous foil to be led into the moulding step. Handling a continuous foil strip is sometimes more advantageous from the viewpoint of mass production than placing separately cut pieces of preformed foil into the moulds.

In order to produce the outer layer of the moulding, a mould has been closed at step 607 and polymer resin has been injected into the mould at step 608. The grade of resin and the set of moulding parameters to be used at step 608 have most advantageously been selected to fulfill demanding criteria of good transparency or translucency, pleasant feel and visual appearance. At step 609 the mould is opened. What happens next depends on the mould technology which is used. It is possible to remove the newly injection moulded outer layer from the mould altogether and to place it into another, completely separate mould where the foil and the inner layer are to be added thereto. However, unnecessary ejection of workpieces from moulds is to be avoided if the quality of the moulding should be good: at the priority date of this patent application it is regarded as more advantageous to open the mould at step 609 so that the newly injection moulded outer layer remains within a part of the mould, and change or adjust the other part(s) of the mould in order to prepare for the injection moulding of the inner layer. The surface of the outer layer onto which the foil is to be applied must naturally become exposed when the mould is opened.

At step 610 the patterned, preformed and possibly also cut and trimmed foil is placed into the mould and against the appropriate surface of the outer layer. At step 611 the mould is closed, and at step 612 more polymer resin is injected into the mould in order to produce the inner layer and to fuse the outer layer, the foil and the inner layer into an integrated structure. The grade of resin and the set of moulding parameters to be used at step 612 can be either the same as or different from those that were used at step 608. Using different grade of resin and/or different moulding parameters enables the manufacturer to optimise the second injection moulding step to fulfil criteria of e.g. good structural stiffness rather than fine external features. At step 613 the mould is opened, and at step 614 the completed product is ejected from the mould. Surface finishing treatments and various trimming and upgrading steps may follow thereafter like in known injection moulding processes.

Figure 7:
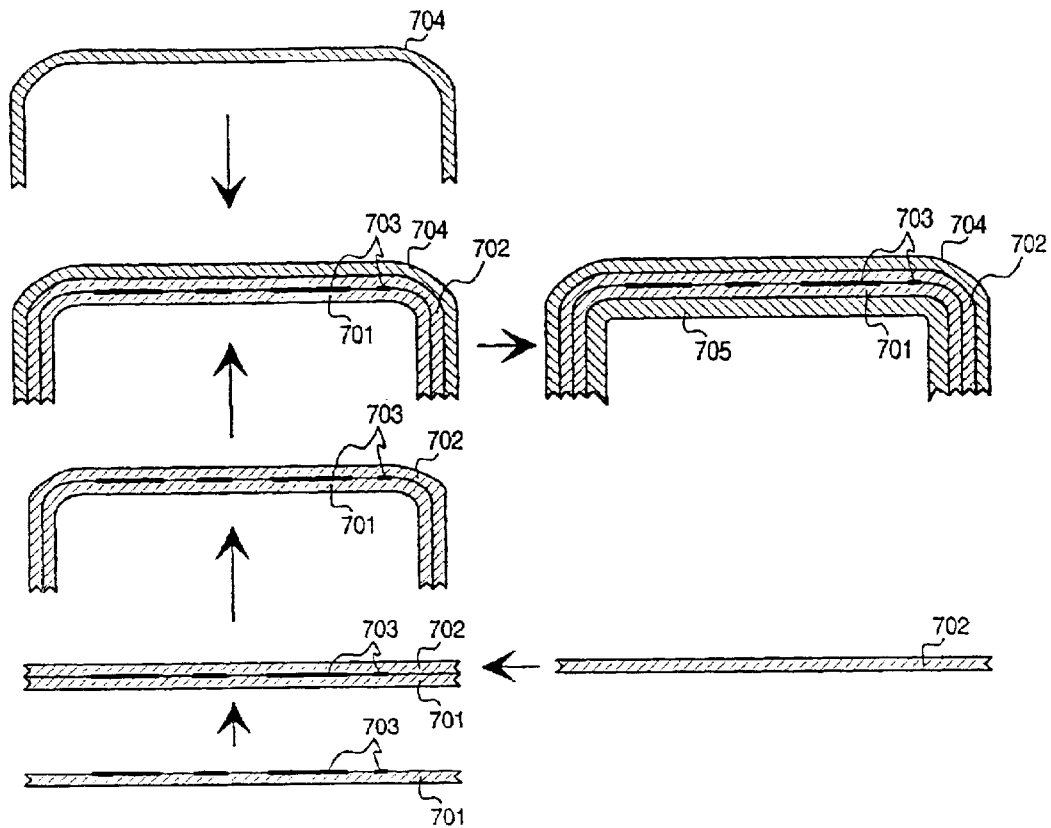
FIG. 7 illustrates a variation of the principle of FIG. 5.

The invention covers also such structures and methods where more foil layers than one or more injection moulded layers than two are used. FIG. 7 illustrates schematically the production of an injection moulded product for which there are first laminated two foils 701 and 702 together. At least one surface of at least one of the foils comprises patterns 703. After laminating the two foils together or in association therewith the foil structure is preformed. An outer layer 704 is produced by injection moulding, and the preformed foil structure is attached to the inner surface of the outer layer. Finally an inner layer 705 is injection moulded to the inside of the whole packet.

Figure 8:
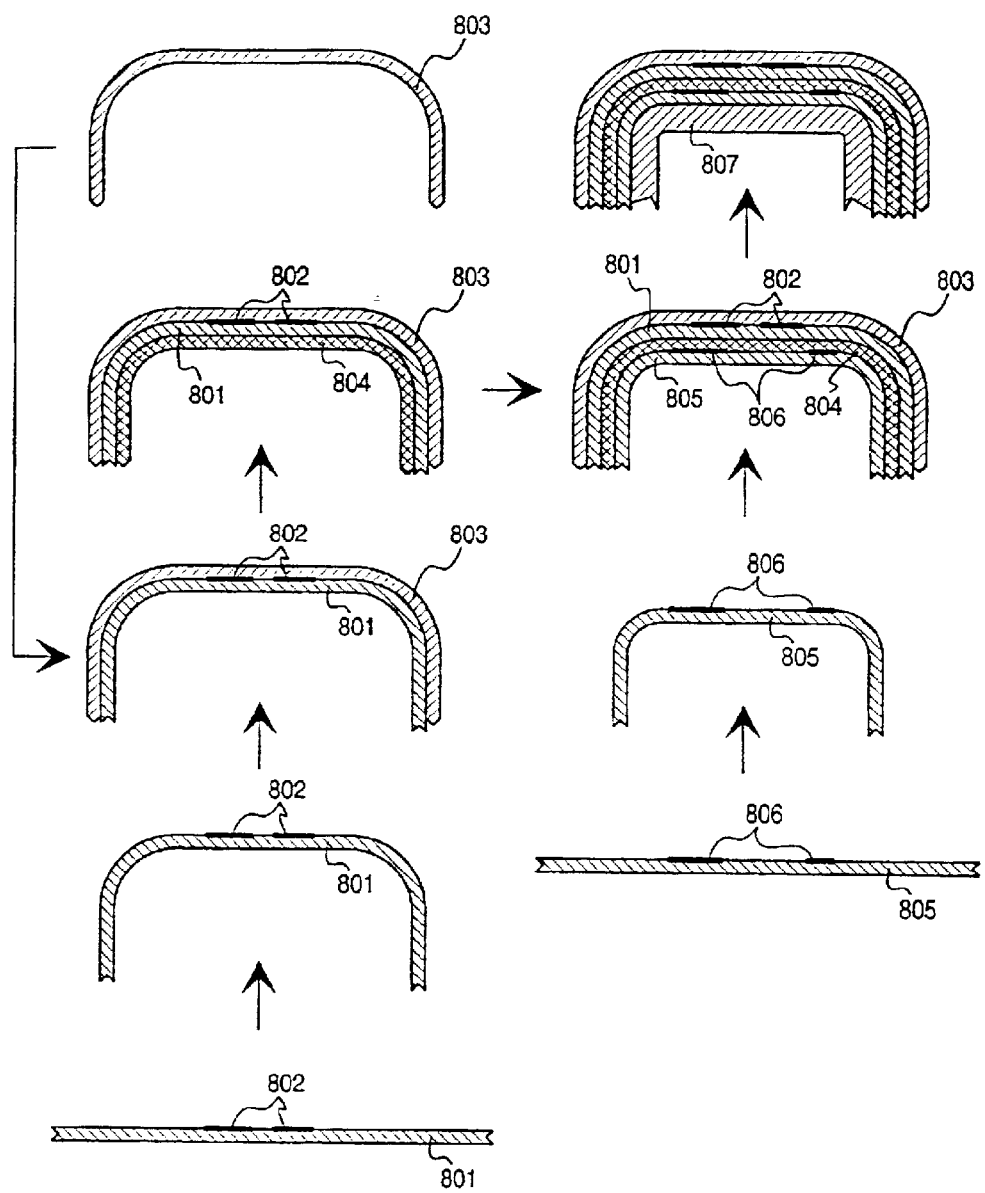
FIG. 8 illustrates another variation of the principle of FIG. 5.

FIG. 8 illustrates schematically the production of an injection moulded product for which there is provided a first foil 801 with patterns 802 on one side. The patterned first foil 801 is preformed, and an outer layer 803 is injection moulded. The preformed, patterned first foil 801 is placed the patterned side first against the inner surface of the outer layer 803, and an intermediate layer 804 is injection moulded onto the inside of the combined outer layer 803 and first foil 801. A second foil 805 is provided with patterns 806 on its one side. The patterned second foil 805 is preformed and placed the patterned side first against the inner surface of the combination consisting of the outer layer 803, the first foil 801 and the intermediate layer 804. Finally an inner layer 807 is injection moulded to the inside of the whole packet. In the end product there are three injection moulded layers, separated from each other by the patterned foils. If all patterns should be visible for external visual inspection, at least the outer and intermediate layers must be at least partly transparent or translucent.

So far the main emphasis of the preceding discussion has been in the application of the invention for decorative purposes, which means that the outer layer(s) must be at least partly transparent or translucent. However, it is also possible to present an embodiment of the invention where at least one of the patterns on the patterned foil is meant to act as a secret security code, the existence of which within an injection moulded product can only be verified by using specific equipment. For example, the secret security code pattern may be made of a thin metal layer sputtered or otherwise generated onto a surface of the foil. At the location of the secret security code there is at least one structural layer on each side of the secret security code that is opaque enough to hide the secret security code from visual inspection under normal conditions. These layers are, however, permeable to X-rays or other suitably energetic electromagnetic radiation which penetrates through the other opaque layers but does not penetrate the secret security code or is at least remarkably attenuated by the material thereof. Under normal conditions it is therefore impossible to say, whether the injection moulded product contains the secret security code or not, while the question is easily solved by placing the product into a transillumination device employing said suitably energetic electromagnetic radiation.

Figure 9:
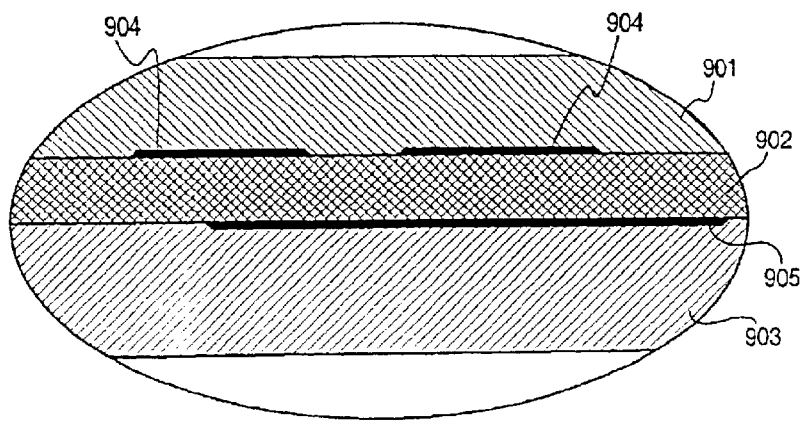
FIG. 9 illustrates another variation of the principle of FIG. 5, FIG. 10 schematically illustrates the production of an injected molded product, and FIG. 11 schematically illustrates another process for producing an injection molded product.

FIG. 9 is an enlarged cross-sectional diagram of a part of an injection moulded product according to an embodiment of the invention. Here the secret security code feature is associated to the decorative use of the invention. The product comprises an injection moulded outer layer 901, a foil 902 and an injection moulded inner layer 903, of which only the outer layer 901 is transparent or translucent to visible light. On the outer surface of the foil 902 there are decorative patterns 904 which are to be visible through the transparent or translucent outer layer 901. However, at either the same location or at least partly at a different location of the foil and on the inner side of it there is a secret security code pattern 905 which is hidden from normal visual inspection, because the opaque foil 902 hides it from outside and the opaque inner layer 903 hides it from the inside. The secret security code pattern 905 is only observable in a transillumination device which illuminates the product with other electromagnetic radiation than visible light, for which other electromagnetic radiation the outer layer 901, the decorative patterns 904, the foil 902 and the inner layer 903 are transparent or translucent but the secret security code pattern 905 is not. If the secret security code pattern 905 is made of metal and not of printing ink, it is no problem to place it against the inner layer since materials like metal are much more resistent to the erosion of molten polymer resin than printing inks.

If the invention is applied only to produce secret security codes, it is not necessary to use transparent layers at all. In the simplest of such embodiments the injection moulded product is made as has been described above in association with FIGS. 5 and 6, with the exception that all used polymer resins are opaque to visible light.

Figure 10:
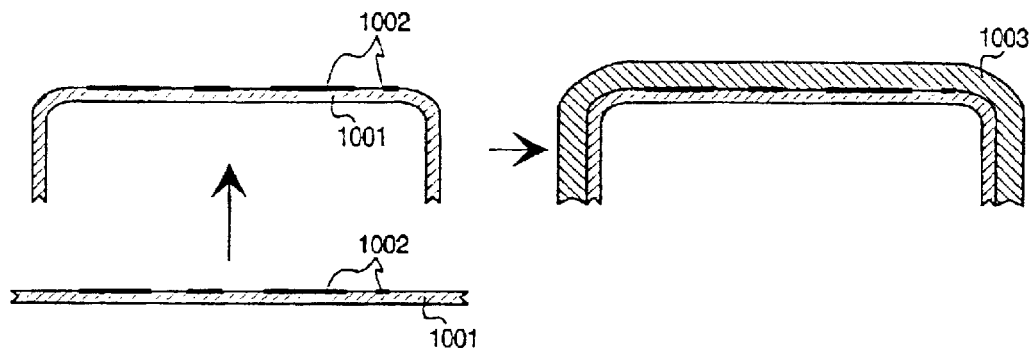
Figure 11:
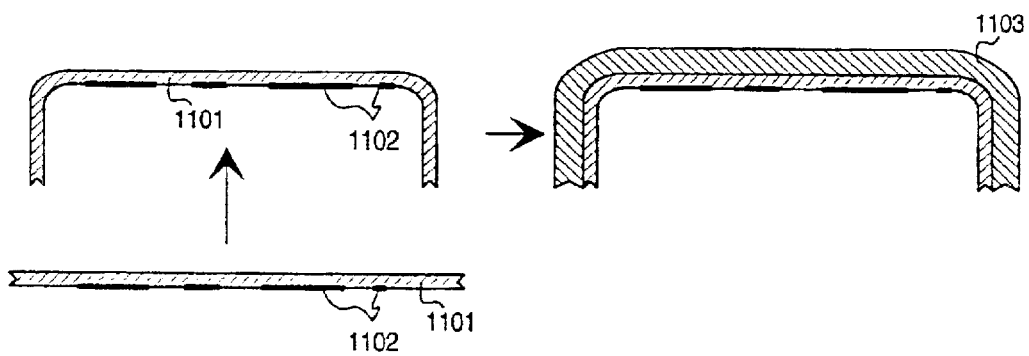

FIG. 10 illustrates schematically the production of an injection moulded product for which there is provided a single foil 1001, which comprises patterns 1002 on at least one surface thereof. The foil is preformed and placed into a mould, where a layer of (preferably) at least partly transparent or translucent material is injection moulded on top of the patterned foil 1001 to constitute an outer surface 1003 of the injection moulded product. FIG. 11 illustrates schematically a similar process where the difference to FIG. 10 lies in the fact that the patterns 1102 are placed on the inside of the foil 1101 instead of that side that comes against the injection moulded top layer 1103. The advantage of the process of FIG. 11 is the better resistance of the patterns 1102 against the conditions occurring during the injection moulding step.

A method for manufacturing the injection moulded structures of FIGS. 10 and 11 is easily produced by slightly modifying the method of FIG. 6. The modification includes leaving out steps 607, 608 and 609 and arranging the resin injecting step 612 so that resin is injected on top of the foil instead of below it as was previously explained.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explictly stated.

What is claimed is:

1. A method for manufacturing an injection moulded product, comprising the steps of:
   producing patterns on a foil of plastic film,
   forming the patterned foil into a certain three dimensional form,
   injection moulding a first injection moulded layer,
   placing the formed patterned foil next to said first injection moulded layer, and
   injection moulding a second injection moulded layer onto an entity comprising the first injection moulded layer and the foil, so that the first injection moulded layer, the formed patterned foil and said second injection moulded layer come to constitute, in this order, an integral layered structure where a first side of the formed patterned foil is next to an internal surface of the first injection moulded layer and said second injection moulded layer is next to a second side of the formed patterned foil.

2. A method according to claim 1, wherein step of producing patterns on a foil comprises the application of at least one of the following: screen printing, offset printing, digital printing, etching, holographic picture generation, painting, sputtering, plating, perforating, glueing or placing stickers onto the film type foil.

3. A method according to claim 1, wherein the step of placing the foil next to the first injection moulded layer comprises the step of placing the foil next to said first injection moulded layer so that an unpatterned surface of the foil is left exposed.

4. The method of claim 1, wherein at least a portion of the first injection moulded layer is transparent or translucent to visible light.

5. The method of claim 1, wherein the first injection moulded layer includes visual effect particles embedded in the injection moulded substance.

6. The method of claim 1, wherein the first injection moulded layer comprises a colouring agent mixed into the injection moulded substance.

7. The method of claim 1, wherein the foil includes a first base foil having an unpatterned side and at least a second foil.

8. The method of claim 1, wherein at least a portion of the second injection moulded layer is transparent or translucent to visible light.

9. The method of claim 1, further comprising forming a security code in the patterns on the foil, wherein the security code is within the integral layered structure and surrounded by layers that are opaque to visible light but translucent to certain other electromagnetic radiation, and the security code is essentially less translucent to the other electromagnetic radiation than the surrounding layers.

10. A method for manufacturing an injection moulded product, comprising:
    producing patterns on at least one of a plurality of foils of plastic film;
    laminating the plurality of foils together;
    forming the laminated foils into a certain three dimensional form before placing it next to any injection moulded layer,
    injection moulding a first injection moulded layer,
    placing the formed patterned foils next to the first injection moulded layer, and
    injection moulding a second injection moulded layer onto a structure including the first injection moulded layer and the laminated foils, so that the first injection moulded layer and the laminated foils form a integral layered structure where a first side of the laminate foils is next to an internal surface of the first injection moulded layer and the second injection moulded layer is next to a second side of the laminated foils.

11. The method of claim 1, wherein the plastic film comprises a polycarbonate film.

12. The method of claim 10, wherein the plastic film comprises a polycarbonate film.

* * * * *